United States Patent [19]

Felgenhauer

[11] Patent Number: 5,602,708

[45] Date of Patent: Feb. 11, 1997

[54] PROCESS AND DEVICE FOR ELECTRONICALLY MONITORING THE OVERLOAD ON ELECTRIC MOTOR DRIVES

[75] Inventor: Klaus Felgenhauer, Lahntal, Germany

[73] Assignee: Leica Mikroskopie und Systeme GmbH, Wetzlar, Germany

[21] Appl. No.: 397,059

[22] PCT Filed: Aug. 5, 1993

[86] PCT No.: PCT/DE93/00685

§ 371 Date: Mar. 14, 1995

§ 102(e) Date: Mar. 14, 1995

[87] PCT Pub. No.: WO94/07289

PCT Pub. Date: Mar. 31, 1994

[30] Foreign Application Priority Data

Sep. 16, 1992 [DE] Germany .......................... 42 30 873.9

[51] Int. Cl.⁶ .......................................... H02H 3/00
[52] U.S. Cl. ............................... 361/51; 340/648; 361/23
[58] Field of Search ................................ 361/23, 24, 25, 361/28–31, 33, 93, 91, 88, 86, 87, 51; 318/563, 565, 566, 466–469, 434; 340/648, 664

[56] References Cited

U.S. PATENT DOCUMENTS

| | | | |
|---|---|---|---|
| 4,839,819 | 6/1989 | Begin et al. | 361/30 |
| 4,947,091 | 8/1990 | Fukuoka | 318/434 |
| 5,260,632 | 11/1993 | Schalz | 318/606 |

FOREIGN PATENT DOCUMENTS

| | | | |
|---|---|---|---|
| 0456874 | 11/1991 | European Pat. Off. | H02H 7/093 |
| 2123145 | 9/1972 | France | H02H 7/00 |
| 4028241 | 3/1992 | Germany | G05P 3/12 |
| 1363738 | 8/1974 | United Kingdom | H02H 7/08 |

OTHER PUBLICATIONS

Soviet Inventions Illustrated, *Derwent Publications Ltd.*, Week 8423, p. 18, (Jul. 18, 1984).

*Primary Examiner*—Jeffrey A. Gaffin
*Assistant Examiner*—Ronald W. Leja
*Attorney, Agent, or Firm*—Foley & Lardner

[57] ABSTRACT

A process and a circuit arrangement are proposed for electronically monitoring the overload on electric motor drives and in the case of which process and circuit arrangement speed is .monitored in addition to the known methods for real power monitoring. This also enables monitoring of the operating state of an electric motor drive, which is subject to a load, below the nominal rotation speed. This allows monitoring of the overload not only in the case of electric motor drives in the direct-current mode but also in the pulsed mode, as well as in the case of stepping motors.

16 Claims, 2 Drawing Sheets

PROCESS AND DEVICE FOR ELECTRONICALLY MONITORING THE OVERLOAD ON ELECTRIC MOTOR DRIVES

BACKGROUND OF THE INVENTION

1. Field of the Invention

The invention relates to a process and to a circuit arrangement for electrically monitoring the overload of an electric motor drive.

2. Description of the Related Art

Electric motor drives are in very widespread use, for example for driving electric tools, domestic appliances, office machines, pumps, conveyor systems, positioning devices, electric railways etc. A differentiation is drawn between direct-current, alternating-current and three-phase motors as well as stepping motors, which are used either in the continuous-current mode or in the pulsed-current mode.

A common feature of all applications is that the electric motor drive must move an object which can have a great weight, depending on the application (for example the conveyed material and the conveyor belt in the case of electrically driven conveyor systems, or the electrically movable gantry of a gantry measurement machine). In order to move the object, the electric motor drive must consume electric power, the so-called real power. The heavier the object to be moved, the greater is the load on the motor and thus the real power of the motor. A major change in the real power occurs at the time when the load is connected, that is to say when the electric motor drive is mechanically connected to the object to be moved (for example by a coupling between the two). There is likewise a load connection when, for example, an electrically driven milling tool touches the workpiece to be machined.

After the electric motor drive has been switched on, its rotation speed rises continuously until the nominal rotation speed which is specified for the respective application (i.e., a predetermined rotation speed for the respective application) is reached. The nominal rotation speed when the load is not connected is called the no-load rotation speed. When the load is connected, the nominal rotation speed falls from the value of the no-load rotation speed in proportion to the load. The time between switching on the electric motor drive and reaching the nominal rotation speed is called the starting phase, and the time after that is called continuous operation.

In continuous operation, the load capacity of an electric motor drive is limited by its heating. The actual real power in continuous operation is called the nominal power, the maximum permissible nominal power being the rated power. Electric motor drives may be briefly loaded beyond their rated power.

The real power rises very quickly from zero during the starting phase, that is to say after the electric motor drive has been switched on, to a peak value which is considerably above the rated power, and does not fall to the value of the nominal power until the nominal rotation speed is reached. The peak value of the real power occurs because the electric motor drive initially has to overcome its own mechanical inertia and the real power consumption is limited in the starting phase only by the winding resistance and inductance of the electric motor drive. For an electric motor drive which is subject to load, this peak value is above that of the unloaded electric motor drive.

A process of the type mentioned initially is known for avoiding overheating of an electric motor drive itself, or else, for example, for identifying tool wear and tool fracture on machine tools which are driven by electric motors. It is suitable for monitoring the overload of electric motor drives (direct current, alternating current or three phase) in continuous-current mode, whose load is not connected until the nominal rotation speed is reached, such as machine tools, for example. In this case, use is made of the fact that the time profile of the real power curve is constant after the nominal rotation speed has been reached and rises to a level proportional to the load when the load is connected. If an overload occurs, the instantaneous real power rises suddenly. A comparison of the instantaneous real power with a power warning threshold which represents the overload state and is itself time-dependent for loads which vary with time, thus indicates that a critical state has been reached. A switching and/or warning signal is initiated when the power warning threshold is exceeded.

For monitoring, the current consumption is measured and the instantaneous real power is determined from it. In the case of electric motor drives which are operated using direct current, the current measurement is carried out by means of a Hall sensor, and the current measurement is carried out by means of a current transformer in the case of electric motor drives which are operated using alternating current. The current measurement can be carried out continuously.

The actual monitoring with threshold value comparison is, however, not switched on in the case of the known process until the starting phase of the electric motor drive has been completed. This is done at a preselected time after the electric motor drive has been switched on, since the normal time profile of the real power curve is known. However, the switching-on time can also be determined from when the real power reaches a constant value.

The known process therefore does not cover all the operating states of an electric motor drive. This is based on the fact that, in the case of all electric motor drives in the starting phase, the power consumption rises rapidly to a peak value well above the power warning threshold for an overload state and does not fall to a constant value, well below the peak value, thereafter until the nominal rotation speed has been reached. In practice, the described peak value is frequently not reached as a result of the amplifier stages of the power supply device of the electric motor drive being overdriven, but a plateau occurs before reaching the peak value in the time profile of the real power, which plateau is well above the power warning threshold. Its level is determined by the current amplifier limiting. It is thus also not possible to measure additional peak values, which are caused by overloads, in the region of the amplifier limiting. The known process is thus not suitable for monitoring the overload during the starting phase of an electric motor drive.

The known process can thus also not be used for monitoring the overload of pulse-driven electric motor drives or stepping motors since they are operated, for example, in the case of short movement paths or slow movement speeds, below their nominal rotation speed and, in the sense of the present description, thus do not come out of the starting phase.

However, it is desirable to monitor the overload in all the operating states, especially for electric motor drives having a permanently connected load (for example positioning devices), because they can reach an overload state even before reaching the rated rotation speed (for example as a result of mechanical seizure).

SUMMARY OF THE INVENTION

The invention is thus based on the object of specifying a process and a circuit arrangement which also allow monitoring of the operating state of an electric motor drive below the nominal rotation speed and thus enable overload monitoring not only in the case of electric motor drives in the continuous-current mode but also in the pulsed mode, as well as in the case of so-called stepping motors.

This object is achieved according to the invention in the case of a process of the type mentioned initially by the distinguishing features of claim 1. A circuit arrangement for carrying out this process is given in claim 3. Advantageous developments of the process as well as advantageous variants of the device result from the respective subclaims.

By means of the invention, electronic monitoring of the overload on electric motor drives is created which can be used both in the case of electric motor drives having a load which can be connected and in the case of such drives having a load which is permanently connected. It offers the advantage of reliably being able to identify overload states even in the starting phase of the electric motor drive, that is to say before reaching the rated rotation speed. As a consequence, overload monitoring can be carried out both on electric motors in the continuous-current mode and on stepping motors, as well as on electric motors operated in a pulsed manner.

The invention is based on monitoring the operating state of an electric motor drive in the starting phase by observing a measurement variable which is proportional to the expected movement of the electric motor drive. Such a measurement variable is the speed of the electric motor drive. Both the rotation speed of an electric motor and, in the case of linear displacement drives, the propulsion speed, can be used for monitoring.

In addition to the real power measurement using a power threshold value comparison after reaching the rated rotation speed, the instantaneous speed is measured and compared with a speed threshold value which is dependent on the switching-on time of the electric motor drive and corresponds to an overload state. As soon as an overload occurs, the instantaneous speed is reduced. An independent switching and/or warning signal having the identifier "overload" is initiated when the speed threshold value is undershot.

BRIEF DESCRIPTION OF THE DRAWINGS

The process according to the invention and the circuit arrangement according to the invention are described in the following text with reference to an exemplary embodiment.

DETAILED DESCRIPTION OF THE PREFERRED EMBODIMENTS

Figure 1:
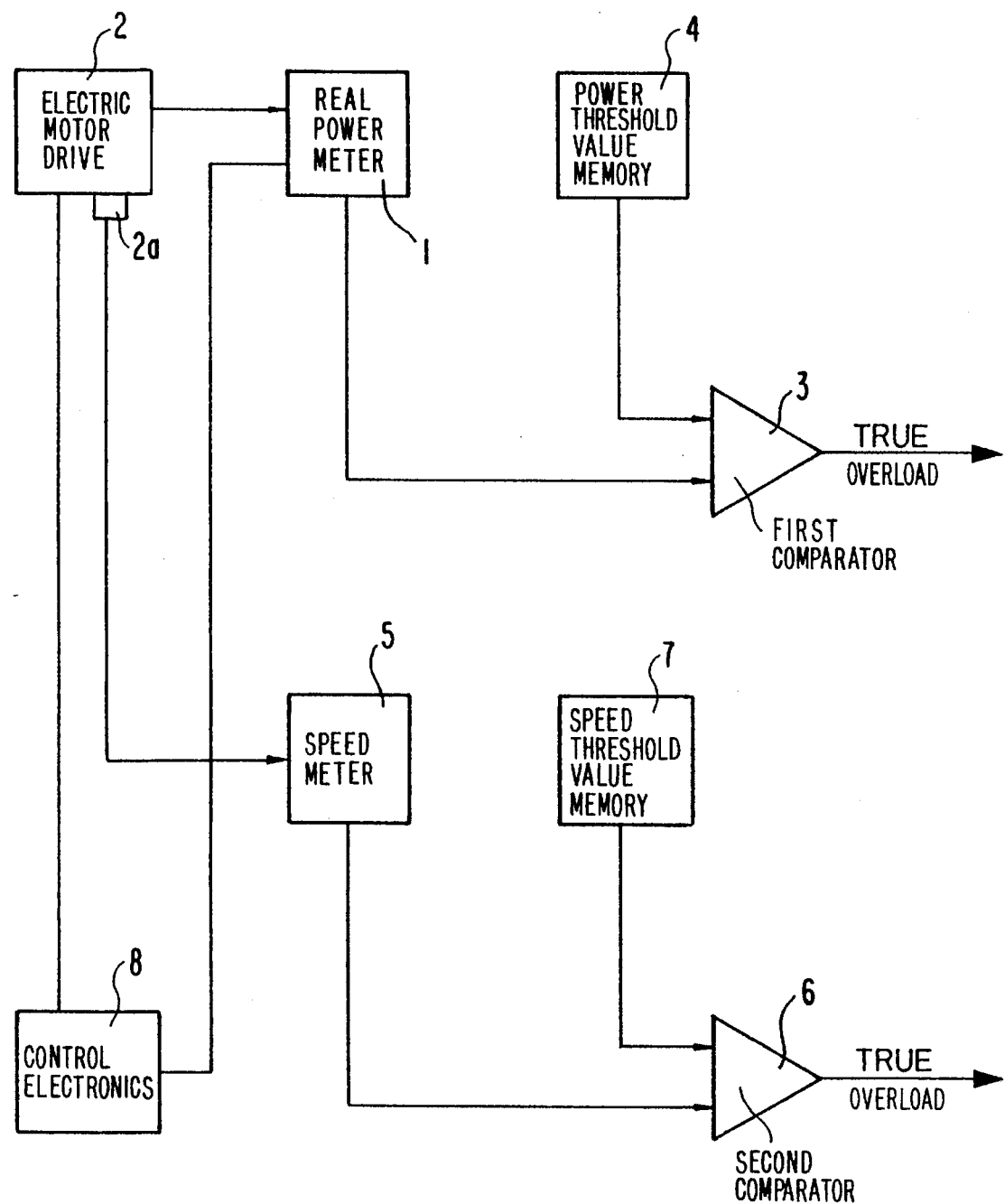
FIG. 1 shows an exemplary embodiment of a circuit arrangement according to the invention having an electric motor drive which is to be monitored.

A real power meter 1 and a speed meter 5 are connected to an electric motor drive 2 which is to be monitored, is illustrated only schematically, and which has an angle resolver 2a. The electric motor drive 2 is supplied from a power supply device which is not illustrated. On starting up control electronics 8, which are connected to the electric motor drive 2 and to the real power meter 1, the actual real power monitoring is activated on reaching or after reaching the nominal (i.e., predetermined) rotation speed of the electric motor drive. This is done after a suitably preselected time after switching on the electric motor drive 2, since the normal time profile of the real power curve is known, or as a function of the actually measured rotation speed. After this time, the output signal of the real power meter 1 is passed to the first input of a first comparator 3. A power threshold value which represents an overload state is stored in the power threshold value memory 4 and is supplied to the second input of the first comparator 3.

Since the real power is a load-proportional variable, the power threshold value is preselected to be a specific amount above the real power caused by the normally connected load. If the load is constant with respect to time, the power threshold value is thus likewise constant with respect to time. If the load changes in a time-dependent manner, for example during an operation of a machine tool, time-dependent load threshold values can be stored in the power threshold value memory 4. The power threshold value associated with the respective time of the real power measurement is then supplied to the first comparator 3.

If the instantaneously measured real power exceeds the power threshold value, the first comparator 3 supplies on its output a signal which initiates a switching and/or warning signal having the identifier "overload". The disconnection of the drive, for example, can thus be selected.

The speed meter 5 is not driven by the control electronics 8. It measures the speed of the electric motor drive 2 continuously, that is to say, even during the starting phase before the nominal rotation speed is reached. For this purpose, either the propulsion speed can be measured by measuring the linear movement per time interval, or the rotation speed can be measured by measuring the rotation angle per time interval. In this exemplary embodiment, an angle resolver 2a is provided on the electric motor drive 2 for measuring the rotation angle per time interval.

The output signal of the speed meter 5 is passed to the first input of a second comparator 6. A speed threshold value which is stored in the speed threshold value memory 7, is time-dependent and represents an overload state, and is passed to the second input of said second comparator 6. This speed threshold value indicates the tolerated error from the movement of the electric motor drive 2 which is expected under normal operating conditions. In this case, the expected movement depends on the time when the electric motor drive 2 is switched on, after which the electric motor drive 2 is operated with continuous current or with pulsed current. If the instantaneously measured speed undershoots (i.e., is less than) the speed threshold value, this indicates an overload state. The second comparator 6 then supplies at its output a signal which initiates a switching and/or warning signal, which is independent of the real power, having the identifier "overload".

Figure 2:
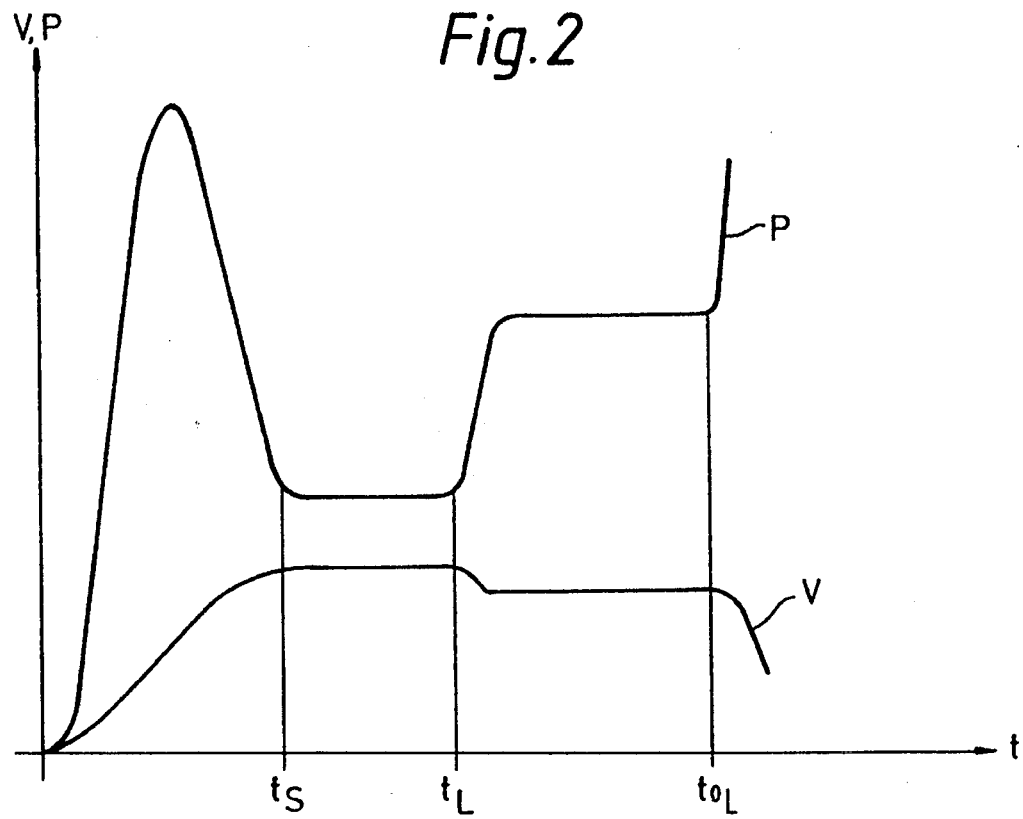
FIG. 2 shows a typical time profile of the real power and of the rotation speed of an electric motor drive having a constant load which can be connected after reaching the nominal rotation speed.
Figure 3:
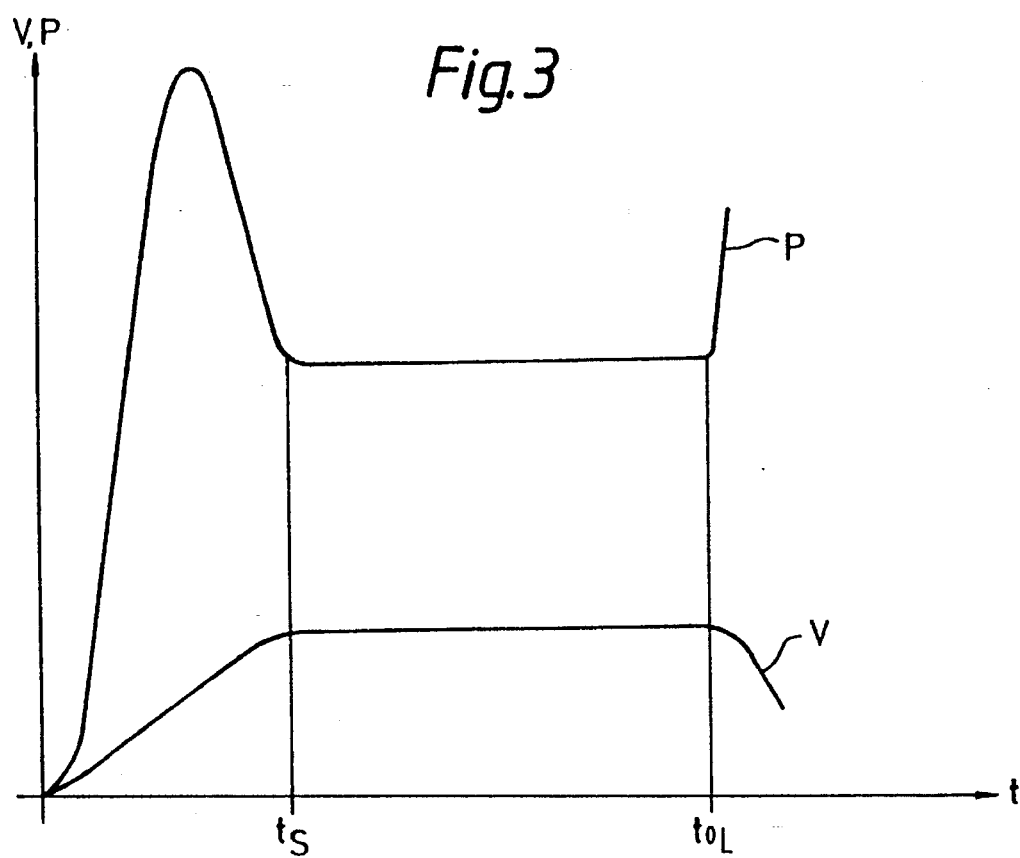
FIG. 3 shows a typical time profile of the real power and of the rotation speed of an electric motor drive having a constant load which is connected permanently.

FIG. 2 shows the typical time profile of the real power and of the speed of an electric motor drive 2 in the continuous-current mode, whose load is connected after reaching the nominal rotation speed. FIG. 3 shows the same measurement variables for an electric motor drive in the continuous-current mode with a continuous load. The nominal rotation speed is reached at the time $t_s$. $t_L$ designates the time when the load is connected in FIG. 2, this not being illustrated in FIG. 3 because of the permanently connected load. $T_{OL}$ indicates a time at which an overload occurs in the examples here.

The continuous rise in the speed until the nominal rotation speed is reached can be seen in FIGS. 2 and 3. After this, the speed is load-dependent, that is to say, it falls as the load rises. A constant load results, as illustrated, in a constant speed.

The real power rises from zero and reaches a load-dependent peak value. This is thus correspondingly greater in FIG. 3, that is to say, when a continuous load is connected, than in FIG. 2. After reaching the peak value, the real power falls to a no-load level on reaching the nominal rotation speed. As soon as the load is connected, it then rises to a load-proportional level. The power threshold value is selected above this load-proportional real power value. A threshold value below the illustrated speed is specified in a corresponding manner for the speed.

If an overload occurs after reaching the nominal rotation speed and after connection of the load at the time $T_{OL}$, the real power rises suddenly. In contrast, the speed in the event of an overload falls comparatively slowly as the real power rises. It can be seen that monitoring of the overload is possible with the aid of a speed monitor with threshold value comparison even after reaching the rated rotation speed and after connection of the load. Monitoring of the overload with the aid of real power monitoring with threshold value comparison is, so to say, the "slicker" method since the threshold value is reached in the shorter time here. In contrast, speed monitoring with threshold value comparison is the "more inert" method, since it responds more slowly in the event of an overload. This can be made use of, depending on the application. Thus, it may be desirable for minor, brief overloads not to lead to system disconnection immediately. In this case, the "more inert" method would be preferred, the overload warnings having to be suppressed as a result of the real power monitoring. Combined monitoring will be selected for the majority of systems, that is to say the speed is monitored in the starting phase, while the real power is monitored, in contrast, in continuous operation after reaching the nominal rotation speed.

Real power monitoring with threshold value comparison is unsuitable for the operating states before the nominal rotation speed is reached, because of the described way in which the real power passes through a peak value well above the power threshold value. Monitoring of the overload with the aid of speed monitoring with threshold value comparison is very sensitive, in contrast, in this region, because the speed rises continuously in the starting phase.

Only as a result of the proposed mutual supplementing of the monitoring of the real power and speed of the electric motor drive is it possible to implement monitoring of the overload even in those cases which are distinguished by small movement paths of a continuously loaded electric motor drive below the nominal rotation speed, for example, in the pulsed mode as well. As a consequence, the invention is particularly suitable for use in the case of positioning drives having very small movement paths, such as that which is required, for example, for various purposes in the case of scanners (for example sample scans in the case of surface examinations). Another field of application is in motorized functions on microscopes, such as the height adjustment of the object table for focusing purposes, for example. This demands very small movement paths which can be achieved only by pulsed operation of the electric motor drive. Damage to the observed object and to the objective as a result of mutual collision is then avoided by the monitoring of the overload.

FIG. 3 describes the said curve profiles for an electric motor drive in the continuous-current mode. For an electric motor drive in the pulsed-current mode, this drive in each case experiences small speed increases as a result of the individual current pulses, which increases overall lead to a continuous rise in the speed and, after a specific number of pulses, to a load-proportional, constant, mean speed (cf. for example DE 40 28 241 A1). As a consequence, the time profile of the speed moves upwards and downwards with small errors in a quasi-oscillating manner about that speed profile which is illustrated in FIG. 3. A typical curve profile thus also results here which is dependent on the switching-on time of the electric motor drive and from which speed threshold values can be derived. Using these speed threshold values, it is possible to carry out monitoring of the overload in all the operating states, even of the electric motor drive which is operated in a pulsed manner.

In contrast, in pulsed operation, monitoring of the overload with the aid of real power monitoring is fundamentally unusable since the electric motor drive is repeatedly energized with each current pulse, which means a new starting phase every time. Furthermore, in pulsed operation, use is made of the fact that the brief pulse can load the electric motor drive beyond the rated power provided only that the real power remains below the rated power when averaged with respect to time. In the case of real power monitoring, this would immediately lead to an overload report, while increasing the power threshold value would disguise any possibly occurring overload state. Monitoring of the overload can thus be achieved only by means of speed monitoring in the case of electric motor drives which are operated with pulsed current as well as stepping motors.

I claim:

1. A process for electronically monitoring an overload on an electric motor drive, comprising the steps of:

measuring an instantaneously consumed real power of the electric motor drive, comparing the measured instantaneous real power consumption with a power threshold value which represents an overload state, initiating a switching and/or warning signal if the power threshold value is exceeded, measuring an instantaneous speed of the electric motor drive, comparing the measured instantaneous speed of the electric motor drive with a speed threshold value which depends on a switching-on time of the electric motor drive and represents the overload state, and producing an additional switching and/or warning signal, which is independent of the first switching and/or warning signal and has an identifier "overload", if the speed threshold value is greater than the measured instantaneous speed of the electric motor drive.

2. The process as claimed in claim 1, wherein the speed-dependent overload monitoring is carried out from a time when the electric motor drive (2) is turned on until a time when a predetermined rotation speed of the electric motor drive is reached, and wherein the power-dependent overload monitoring is activated thereafter.

3. The circuit arrangement as claimed in claim 2, wherein the speed-dependent overload monitoring is deactivated as soon as the power-dependent overload monitoring is activated.

4. The circuit arrangement as claimed in claim 2, wherein the power threshold value is set to a value a predetermined amount below a maximum of the instantaneous consumed real power measured between the time when the electric motor drive (2) is turned on to the time when the predetermined rotation speed of the electric motor drive (2) is reached.

5. A circuit arrangement for electronically monitoring an overload on an electric motor drive, comprising:

a real power meter (1) for measuring a real power instantaneously consumed by the electric motor drive after the electric motor drive has been started, and for outputting a first output signal indicative thereof, a power threshold memory (4) for storing a power threshold value, a first comparator (3) to whose first input the first output signal of the real power meter (1) is passed and to whose second input the power threshold value is passed which is retrieved from the power threshold value memory (4) and which represents an overload state, and at whose output a first signal is emitted if the measured real power exceeds the power threshold value, the first signal initiates a first switching and/or warning signal having an identifier "overload", a speed meter (5) for measuring an instantaneous speed of the electric motor drive (2) and for outputting a second output signal indication thereof, a speed threshold value memory (7) for storing a speed threshold value, a second comparator (6) to whose first input the second output signal of the speed meter (5) is passed and to whose second input the speed threshold value is passed which is retrieved from the speed threshold value memory (7) and which is dependent on a time at which the electric motor drive is switched on, and at whose output a second signal is emitted if the speed threshold value is greater than the measured instantaneous speed, the second signal initiates a second switching and/or warning signal, which is independent of the first switching and/or warning signal, and also having the identifier "overload".

6. The circuit arrangement as claimed in claim 5, wherein one of a stepping motor and an electric motor driven by pulsed current are provided as the electric motor drive (2).

7. The circuit arrangement as claimed in claim 5, wherein an angle resolver is arranged on the electric motor drive (2) in order to determine the instantaneous speed of the electric motor drive (2), the angle resolver being connected to the speed meter (5).

8. The circuit arrangement as claimed in claim 5, wherein the first switching and/or warning signal is used to indicate an overload condition of the electric motor drive (2) starting from a first time corresponding to when the electric motor drive (2) is switched on to a second time corresponding to when a load is connected to the electric motor drive (2), and wherein the second switching and/or warning signal is used to indicate the overload condition of the electric motor drive (2) starting from the second time to a third time, the third time being when one of the electric motor drive (2) is switched off and the load is disconnected from the electric motor drive (2).

9. The circuit arrangement as claimed in claim 5, wherein the first switching and/or warning signal is used to indicate an overload condition of the electric motor drive (2) starting from a first time corresponding to when the electric motor drive (2) is switched on to a second time corresponding to when a predetermined rotation speed of the electric motor drive (2) is reached, and wherein the second switching and/or warning signal is used to indicate the overload condition of the electric motor drive (2) starting from the second time to a third time when the electric motor drive (2) is switched off.

10. The circuit arrangement as claimed in claim 5, wherein the power threshold value is preselected and stored in the power threshold memory as a value which is a predetermined amount above a real power consumed by the electric motor drive (2) caused by a predetermined load being connected to the electric motor drive (2).

11. The circuit arrangement as claimed in claim 10, wherein the predetermined load changes in a time-dependent manner, and wherein the power threshold memory (4) stores a plurality of values which are sequentially output to the first comparator (3) as the power threshold value to represent the changing in the time-dependent manner of the predetermined load.

12. The circuit arrangement as claimed in claim 11, wherein the speed threshold value indicates a tolerated error from movement of the electric drive motor (2) from a predetermined rotational speed of the electric drive motor (2), the tolerated error varying with respect to the time at which the electric drive motor (2) is switched on, and wherein the speed threshold memory (7) stores a plurality of values which are sequentially output to the second comparator (6) to represent the time-varying aspect of the tolerated error.

13. The circuit arrangement as claimed in claim 5, wherein the speed threshold value indicates a tolerated error from movement of the electric drive motor (2) from a predetermined rotational speed of the electric drive motor (2), the tolerated error varying with respect to the time at which the electric drive motor (2) is switched on, and wherein the speed threshold memory (7) stores a plurality of values which are sequentially output to the second comparator (6) to represent the time-varying aspect of the tolerated error.

14. A method of electronically monitoring an overload on an electric motor drive, comprising the steps of:

a) turning on the electric motor drive at a first time;

b) measuring an instantaneous consumed real power of the electric motor drive;

c) comparing the instantaneous consumed real power with a power threshold value which indicates an overload state of the electric motor drive;

d) measuring an instantaneous speed of the electric motor drive;

e) determining a second time corresponding to when the instantaneous speed reaches a substantially constant value for a period of time;

f) comparing the instantaneous speed with a speed threshold value which indicates the overload state of the electric motor drive;

g) using only the comparison performed in the step c) to indicate the overload condition of the electric motor drive from the second time to any time thereafter; and h) using only the comparison performed in the step f) to indicate the overload condition of the electric motor drive from the first time to the second time.

15. The method as claimed in claim 14, wherein the power threshold value is set to a value below a maximum of the instantaneous consumed real power measured between the first time and the second time.

16. The method as claimed in claim 14, wherein the electric motor drive is one of a pulsed motor and an electric motor driven by pulsed current.

* * * * *